US011764570B2

(12) United States Patent
Ehrhardt et al.

(10) Patent No.: US 11,764,570 B2
(45) Date of Patent: Sep. 19, 2023

(54) LIGHTNING PROTECTION SPARK GAP ASSEMBLY AND METHOD FOR OPERATING A LIGHTNING PROTECTION SPARK GAP ASSEMBLY

(71) Applicant: DEHN SE, Neumarkt i.d. OPf. (DE)

(72) Inventors: Arnd Ehrhardt, Neumarkt (DE); Klaus Bühler, Neumarkt (DE)

(73) Assignee: DEHN SE, Neumarkt i.d. OPf. (DE)

( * ) Notice: Subject to any disclaimer, the term of this patent is extended or adjusted under 35 U.S.C. 154(b) by 148 days.

(21) Appl. No.: 17/606,866

(22) PCT Filed: May 7, 2020

(86) PCT No.: PCT/EP2020/062651
§ 371 (c)(1),
(2) Date: Oct. 27, 2021

(87) PCT Pub. No.: WO2020/225339
PCT Pub. Date: Nov. 12, 2020

(65) Prior Publication Data
US 2022/0209530 A1 Jun. 30, 2022

(30) Foreign Application Priority Data

May 9, 2019 (DE) .......................... 102019206730.1
Jul. 10, 2019 (DE) .......................... 102019210234.4

(51) Int. Cl.
*H01H 85/30* (2006.01)
*H02H 9/04* (2006.01)
(Continued)

(52) U.S. Cl.
CPC ........ *H02H 9/041* (2013.01); *H01H 85/0039* (2013.01); *H01H 85/0241* (2013.01);
(Continued)

(58) Field of Classification Search
CPC .......... H01T 1/00–14; H01T 2/02; H01T 4/14
See application file for complete search history.

(56) References Cited

U.S. PATENT DOCUMENTS 2,305,436 A   12/1942   McMorris ........................ 337/30
3,700,970 A   10/1972   Miyoshi ........................ 361/115
(Continued)

FOREIGN PATENT DOCUMENTS

DE   128433 C    2/1902  ............... H01T 4/14
DE   1064613 B   9/1959  ............. H01H 39/00
(Continued)

OTHER PUBLICATIONS

An Office Action (in German), dated Feb. 28, 2020, issued by the German Patent Office for Applicant's corresponding German Patent Application No. DE102019210234.4, filed Jul. 10, 2019.
(Continued)

*Primary Examiner* — Bryan R Perez
(74) *Attorney, Agent, or Firm* — Bodner & O'Rourke, LLP; Gerald T. Bodner; Christian P. Bodner

(57) ABSTRACT

The invention relates to a lightning protection spark gap assembly. The lightning protection spark gap assembly comprises: a lightning protection spark gap (1); a safety fuse device (8) which can be triggered by a bridge initiator (7) and which is connected between a first or second voltage line (S1, S2) and a corresponding main connection (1, 1*b*) of the lighting protection spark gap (1); and an indicator device (4') for detecting a secondary current flow connecting to a pulse current flow or a corresponding portion of the secondary current flow, and for triggering the safety fuse device (8) by activating the bridge initiator (7) when the detected secondary current flow or the corresponding portion of the secondary current flow fulfills a first predefined criterion, wherein the lightning protection spark gap (1) has a first and a second divergent electrode (21*a*, 21*b*) and an arcing chamber (25),
(Continued)

and wherein the indicator device (4') is electrically connected to the first or second divergent electrode (21a, 21b) and/or the arcing chamber (25) in such a way that it detects the secondary current flow or the corresponding portion of the secondary current flow in the area (L) in which the secondary current arc flows.

24 Claims, 8 Drawing Sheets

(51) Int. Cl.
  *H01H 85/02* (2006.01)
  *H01H 85/38* (2006.01)
  *H01T 1/14* (2006.01)
  *H01H 85/00* (2006.01)
  *H01T 1/02* (2006.01)
(52) U.S. Cl.
  CPC .......... *H01H 85/306* (2013.01); *H01H 85/38* (2013.01); *H01T 1/02* (2013.01); *H01T 1/14* (2013.01); *H01H 2085/381* (2013.01)

(56) References Cited

U.S. PATENT DOCUMENTS

| | | | | |
|---|---|---|---|---|
| 4,710,847 | A | 12/1987 | Kortschinski et al. | 361/125 |
| 4,807,082 | A | 2/1989 | Ranjan et al. | 361/104 |
| 5,406,438 | A | 4/1995 | Ranjan et al. | 361/104 |
| 9,083,153 | B2 | 7/2015 | Ehrhardt et al. | |
| 9,691,560 | B2 | 6/2017 | Zahlmann et al. | |
| 9,871,368 | B2 | 1/2018 | Buhler et al. | |
| 2009/0021881 | A1 | 1/2009 | Crevenat | 361/111 |
| 2013/0063845 | A1 | 3/2013 | Durth et al. | 361/56 |
| 2017/0236674 | A1 | 8/2017 | Durth | 337/31 |
| 2019/0371561 | A1 | 12/2019 | Ehrhardt et al. | |
| 2022/0208498 | A1* | 6/2022 | Ehrhardt | H01H 85/0039 |

FOREIGN PATENT DOCUMENTS

| | | | | |
|---|---|---|---|---|
| DE | 1180451 B | 10/1964 | ........... | H01H 85/044 |
| DE | 1904244 A1 | 8/1970 | ............ | H01H 39/00 |
| DE | 102005024658 B4 | 2/2007 | ............... | H01T 1/10 |
| DE | 102008047256 A1 | 3/2010 | ............ | H01H 39/00 |
| DE | 202009018086 U1 | 2/2011 | ............... | H01C 7/12 |
| DE | 102011051738 A1 | 2/2012 | ............ | H01T 1/08 |
| DE | 102011118713 A1 | 9/2012 | ............ | H01H 19/56 |
| DE | 102012112480 A1 | 5/2014 | ............ | H01T 15/00 |
| DE | 102014215282 B3 | 10/2015 | ............ | H01H 85/44 |
| DE | 102017119285 A1 | 8/2018 | ............ | H01H 85/36 |
| DE | 102017126419 A1 | 8/2018 | ............ | H01H 39/00 |
| EP | 3166193 A1 | 5/2017 | ............ | H01H 79/00 |
| WO | WO2006128761 A1 | 12/2006 | ............... | H01T 2/02 |
| WO | WO2013117176 A1 | 8/2013 | ............... | H01T 1/14 |
| WO | WO2014005747 A1 | 1/2014 | ............ | H01T 15/00 |

OTHER PUBLICATIONS

The Notification Concerning Transmittal of International Preliminary Report on Patentability (Chapter I of the Patent Cooperation Treaty), in English, dated Nov. 18, 2021, which was issued by the International Bureau of WIPO in Applicant's related international PCT application having Serial No. PCT/EP2020/062652, filed on May 7, 2020.

The English translation of the International Preliminary Report on Patentability (Chapter I of the Patent Cooperation Treaty), dated Nov. 2, 2021, which was issued by the International Bureau of WIPO in Applicant's related international PCT application having Serial No. PCT/EP2020/062652, filed on May 7, 2020.

The Written Opinion of the International Searching Authority, in English, dated Jul. 30, 2020, which was issued by the International Bureau of WIPO in Applicant's related international PCT application having Serial No. PCT/EP2020/062652, filed on May 7, 2020.

The International Search Report, in English, dated Jul. 30, 2020, which was issued by the International Bureau of WIPO in Applicant's related international PCT application having Serial No. PCT/EP2020/062652, filed on May 7, 2020.

The Notification Concerning Transmittal of International Preliminary Report on Patentability (Chapter I of the Patent Cooperation Treaty), in English, dated Nov. 18, 2021, which was issued by the International Bureau of WIPO in Applicant's corresponding international PCT application having Serial No. PCT/EP2020/062651, filed on May 7, 2020.

The English translation of the International Preliminary Report on Patentability (Chapter I of the Patent Cooperation Treaty), dated Nov. 2, 2021, which was issued by the International Bureau of WIPO in Applicant's corresponding international PCT application having Serial No. PCT/EP2020/062651, filed on May 7, 2020.

The Written Opinion of the International Searching Authority, in English, dated Jul. 24, 2020, which was issued by the International Bureau of WIPO in Applicant's corresponding international PCT application having Serial No. PCT/EP2020/062651, filed on May 7, 2020.

The International Search Report, in English, dated Jul. 24, 2020, which was issued by the International Bureau of WIPO in Applicant's corresponding international PCT application having Serial No. PCT/EP2020/062651, filed on May 7, 2020.

* cited by examiner

LIGHTNING PROTECTION SPARK GAP ASSEMBLY AND METHOD FOR OPERATING A LIGHTNING PROTECTION SPARK GAP ASSEMBLY

The present invention relates to a lightning protection spark gap assembly and to a method for operating a lightning protection spark gap assembly.

Although applicable to any desired lightning protection spark gap assemblies with diverging electrodes, the present invention and the problems on which it is based are explained with regard to lightning protection spark gap assemblies with diverging electrodes which have a quenching chamber with a plurality of arc splitter plates.

PRIOR ART

DE 10 2017 126 419 A1 and DE 10 2017 119 285 A1 disclose triggerable fusible links which have a bridge igniter as an actuator. The present invention describes methods for activating the bridge igniter in the case of erroneous power follow currents when using the fusible links as a protection apparatus for lightning protection spark gaps.

Triggerable fusible links are usually activated by thermally overloading an auxiliary fusible conductor which is generally used to activate a reactive substance (explosive, exothermic mass, gas production etc.). The activation is often carried out by means of direct load variables or by means of independent signaling from the outside or in combination.

According to DE 1 064 613, such a fuse is triggered, for example, by its own voltage drop on account of a particular current level or a particular current rise by virtue of a voltage-dependent switch causing a current to flow via an auxiliary fusible conductor for the purpose of igniting an explosive mass which destroys the main fusible conductor.

According to DE 1 904 244, a corresponding auxiliary fusible conductor for igniting an explosive charge is activated in an isolating device via a transformer which is controlled on the basis of the current intensity, the current rise, the voltage or the voltage rise etc.

DE 10 2008 047 256 A1 discloses a triggerable fuse which can likewise be actuated by an explosive charge. In addition to activation possibilities from an electronic control unit which evaluates direct load variables such as current load etc., this assembly also has a control input for external signals. Therefore, the devices to be protected can automatically detect virtually any desired and specific load criteria and can activate the overcurrent protection device independently of the pure current load. Secondary effects of a current or voltage load, for example reduced insulation values, leakage fault currents with a temperature increase or risk of fire, arc faults etc., can therefore also be used for triggering, possibly even before damage occurs with a short-circuit current.

U.S. Pat. No. 2,305,436 discloses the use of a triggerable fusible link in combination with a lightning arrester. If the arrester is loaded with pulse currents, the auxiliary fusible conductor is scarcely loaded with a surrounding explosive charge. The propellant charge is ignited only in the case of network-frequency currents with the aid of a frequency divider by heating a heating wire.

U.S. Pat. No. 4,807,082 discloses an activation device for a chemically triggerable fuse. The activation device is passivated by a protection device in the case of transient loads.

DE 20 2009 018 086 discloses a surge arrester having a pyrotechnic disconnecting apparatus which can be activated directly, in particular, by undesirable arcs occurring at the surge arrester and by conventional criteria for assessing the load state of a surge arrester by means of a controller and its signaling.

DE 10 2011 051 738 A1 discloses a lightning protection spark gap with diverging electrodes, wherein the distance between the opposite electrode surfaces is kept short in the ignition region and widens in the running region. The pulse current load is therefore limited substantially to the ignition region, whereas the power follow currents in the running region run along the diverging electrodes and the power follow current arc is split and quenched in a quenching chamber.

DISCLOSURE OF THE INVENTION

The present invention provides a lightning protection spark gap assembly as claimed in claim 1 and a method for operating a lightning protection spark gap assembly as claimed in claim 21.

The respective subclaims relate to preferred developments.

Advantages of the Invention

The essence of the invention is to monitor or assess the reduction in the ability of lightning protection spark gaps to limit power follow current, for example as a result of aging or overloading, for the purpose of disconnection in good time by controlling the bridge igniter of a fusible link.

When lightning protection spark gaps respond as a result of a lightning strike, after the pulse currents have been discharged, such power follow currents caused by the network voltage of the supply network may arise. On account of the high current limitation of these currents by the quenching chamber, the amplitude of the power follow currents, inter alia, is considerably lower than the amplitude of the pulse currents. As a result of the high current limitation, the duration of the power follow currents is also likewise limited to 1 ms to a few ms.

The duration of the power follow currents in the case of a normal function of the lightning protection spark gaps is therefore in the region of the duration of high-energy pulse current loads and the level is lower than the level of the pulse loads. The specific energy of a power follow current is likewise lower than the specific energy of the pulse current which is in the operating range of the respective lightning protection spark gap.

Conventional solutions which are aimed at the current level, current rate of rise, voltage level, voltage rate of rise for the purpose of triggering a fuse are unsuitable because there is only matching to the transient pulse load here in the case of overvoltage devices since these values are all considerably lower in the power follow current than transient load variables which must be repeatedly mastered by the devices without being disconnected. Since the duration of the power follow current and the pulse load is also similar, only very long durations can be considered to be erroneous.

As a result of the fact that the indicator device is electrically connected, according to the invention, to the first or second diverging electrode and/or to the quenching chamber in such a manner that it captures the power follow current profile in the running region of the power follow current arc, it is possible to achieve spatial and temporal separation from the pulse current and the bridge igniter can nevertheless be quickly controlled after 1 ms to a few ms, for example.

The invention therefore advantageously enables virtually delay-free activation of the bridge igniter in the case of erroneous power follow currents irrespective of and in a manner spatially separate from preceding impressed pulse currents.

Control is not effected during the pulse current since otherwise the fuse could be overloaded and there would be danger caused by excessively fast actuation. This is avoided by means of the solution according to the invention of geometrically and therefore temporally separating the pulse current and the follow current or a mechanical delay by means of a very simple solution (no complicated measurement and measurement data evaluation).

The solution according to the invention is simple and cost-effective and protects the lightning protection spark gaps from overloading by means of electrical disconnection. Disconnection is achieved in this case both in the event of danger caused by pulse currents and in the event of danger caused by leakage and power follow currents even before the lightning protection spark gap is overloaded.

In the case of one-off pulse current loads above the operating range of the lightning protection spark gap, disconnection is already effected by the passive response (fusing) of the triggerable fusible link as a result of the $I^2t$ load of the pulse. Control of the bridge igniter is avoided during the pulse current duration since the running region of the diverging electrodes does not see the pulse current. The triggerable fusible link without triggering is therefore already a fully functional fuse with a passive time/current characteristic curve.

If the follow current quenching capacity of the lightning protection spark gap is restricted, the specific energy can be assessed irrespective of the level of the pulse current.

If the first predetermined criterion, for example $I^2t$ criterion, is exceeded, the triggerable fusible link is controlled by means of a mechanical or electrical indicator device with a delay time caused by the running time of the power follow current arc, thus resulting in very quick control when power follow current arises. If appropriate, an additional delay time can be introduced via the mechanical or the electrical component.

Additional control in the case of conventional secondary load variables of the lightning protection spark gap or its components, such as temperature, voltage, pressure, leakage current etc., or a change in these variables, is easily possible with separate mechanical triggering or other coupling.

According to one preferred embodiment, the first diverging electrode has an interruption point, with the result that the first diverging electrode has an electrode region which faces the quenching chamber and can be reached only by the power follow current, and wherein the indicator device is connected between the first main connection and the electrode region. This makes it possible to completely decouple the power follow current from the pulse current.

According to a further preferred embodiment, the quenching chamber has a plurality of arc splitter plates, wherein the indicator device is connected between one of the arc splitter plates and the second main connection.

According to a further preferred embodiment, a current limiting device is connected in series with the indicator device.

According to a further preferred embodiment, one arc splitter plate has an interruption point which is arranged in such a manner that an electrical connection to the indicator device is formed only after the power follow current arc has entered the quenching chamber.

This ensures that the power follow current profile or the corresponding portion of the power follow current profile is captured only after the power follow current arc has completely entered the quenching chamber.

According to a further preferred embodiment, the quenching chamber has a plurality of arc splitter plates, wherein the indicator device is connected between a first and a second voltage probe, and wherein the first and second voltage probes are arranged between two different adjacent arc splitter plates in each case.

According to a further preferred embodiment, the quenching chamber has a plurality of arc splitter plates, wherein the indicator device is connected between a voltage probe and the second main connection, and wherein the voltage probe is arranged between two adjacent arc splitter plates.

According to a further preferred embodiment, the quenching chamber has a plurality of arc splitter plates, wherein the indicator device is connected between two arc splitter plates.

According to a further preferred embodiment, the indicator device has an indicator fuse which can be used to actuate a mechanical actuator, wherein a switch device for activating the bridge igniter can be closed by the mechanical actuator. This enables simple integration in the lightning protection spark gap.

According to a further preferred embodiment, a current divider is connected in parallel with the indicator fuse.

According to a further preferred embodiment, the indicator device has an indicator fuse, wherein the bridge igniter is connected in parallel with the indicator fuse.

According to a further preferred embodiment, a current limiting device is connected in series with the indicator device.

According to a further preferred embodiment, the current level and the current duration of the power follow current profile or of the corresponding portion of the power follow current profile are included in the first predetermined criterion, wherein, in particular, the current level is included quadratically and the current duration is included linearly in the first predefined criterion.

According to a further preferred embodiment, a further indicator device for capturing the pulse current profile or a corresponding portion of the pulse current profile and for triggering the fusible link device by activating the bridge igniter if the captured pulse current profile or the corresponding portion of the pulse current profile satisfies a second predefined criterion is connected in series with the fusible link device. The pulse current and the power follow current can therefore be assessed separately.

According to a further preferred embodiment, the further indicator device has a further indicator fuse which can be used to actuate the mechanical actuator or a further mechanical actuator, wherein the switch device for activating the bridge igniter can be closed by the mechanical actuator or a further switch device for activating the bridge igniter can be closed by the further mechanical actuator.

According to a further preferred embodiment, a further current divider is connected in parallel with the further indicator fuse.

According to a further preferred embodiment, the mechanical actuator or the further mechanical actuator is configured in such a manner that the activation of the bridge igniter can be delayed by a predefined period which is selected in such a manner that the pulse current has substantially decayed before the bridge igniter is activated.

According to a further preferred embodiment, the predefined period is in the range of 1 ms to 5 ms.

According to a further preferred embodiment, the switch device or yet another switch device for activating the bridge igniter can be closed by a capture device for secondary parameters, in particular temperature, pressure and expansion.

According to a further preferred embodiment, the current level and the current duration of the pulse current profile or of the corresponding portion of the pulse current profile are included in the second predetermined criterion, wherein, in particular, the current level is included quadratically and the current duration is included linearly in the second predefined criterion.

BRIEF DESCRIPTION OF THE DRAWINGS

In the drawings.

In the figures, identical or functionally identical elements are provided with the same reference signs.

DESCRIPTION OF THE EXEMPLARY EMBODIMENTS

Figure 1:
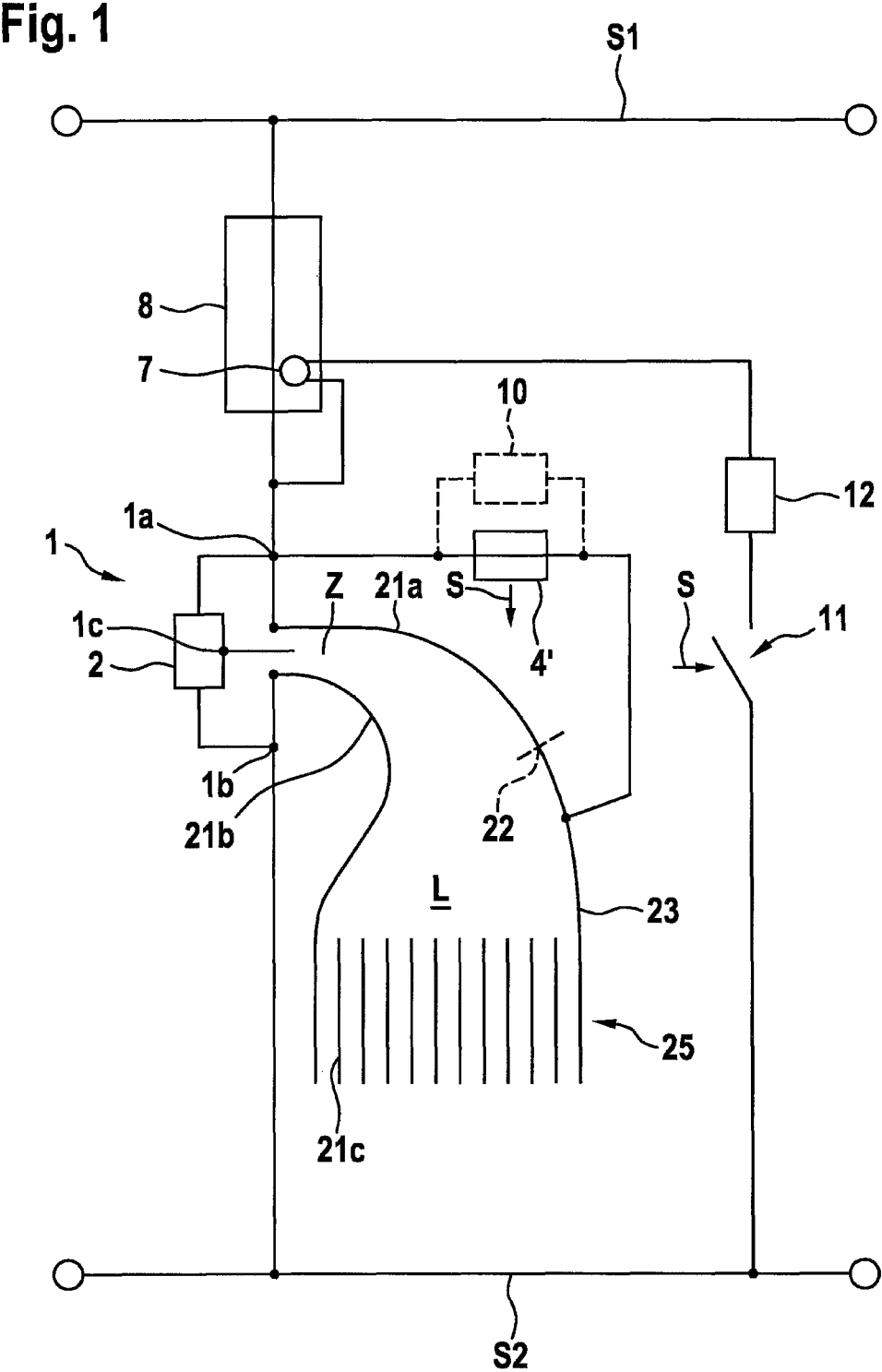
FIG. 1 shows a circuit diagram for explaining a lightning protection spark gap assembly according to a first embodiment of the present invention.

FIG. 1 shows a circuit diagram for explaining a lightning protection spark gap assembly according to a first embodiment of the present invention.

In FIG. 1, reference sign 1 denotes a lightning protection spark gap having a first main connection 1a and a second main connection 1b. The lightning protection spark gap also has a trigger connection 1c, connected upstream of which is a trigger circuit 2. The trigger circuit 2 is also connected to the first and second main connections 1a, 1b.

In other embodiments (not illustrated), the trigger circuit 2 can be connected only to one of the main connections 1a, 1b.

The lightning protection spark gap is, for example, a horn spark gap, as known from DE 10 2011 051 738 A1. In particular, this lightning protection spark gap 1 has a first and a second diverging electrode 21a, 21b. The distance between the first and second diverging electrodes 21a, 21b is kept short in an ignition region Z, whereas the distance between the first and second diverging electrodes 21a, 21b increasingly widens in a running region L.

The first and second diverging electrodes 21a, 21b end in a quenching chamber 25 which has a plurality of arc splitter plates 21c arranged in a parallel manner.

In other embodiments (not illustrated), the electrodes or baffles may already end at some distance below the quenching chamber. The arc then virtually bridges the distance to the quenching chamber through expansion of itself.

A first voltage line S1 of a supply network can be connected to the first main connection 1a via a fusible link device 8 which can be triggered by a bridge igniter 7, and a second voltage line S2 of the supply network can be connected to the second main connection 1b.

The bridge igniter 7 is connected, on the one hand, to the first main connection 1a and, on the other hand, to the second voltage line S2 via a current limiting resistor 12 and a controllable switch device 11.

During operation of the lightning protection spark gap 1, the current load caused by the pulse currents which arise during a lightning strike is limited substantially to the ignition region Z of the first and second diverging electrodes 21a, 21b, whereas the power follow currents which arise on account of the voltage of the supply network run along the first and second diverging electrodes 21a, 21b in the direction of the quenching chamber in the running region L. The follow current arc is finally split and quenched in the quenching chamber 25.

In this example, the inherent fusible function of the fusible link device 8 is used to disconnect the overvoltage protection device in the case of pulse current loads which exceed the proven nominal value of the device, for example a lightning current of 25 kA for a network arrester.

The power follow currents are assessed or captured by an indicator device 4' which is configured in such a manner that it triggers the fusible link device 8 by activating the bridge igniter 7 if the captured power follow current profile or a corresponding portion of the power follow current profile (partial current) satisfies a first predefined criterion. In particular, with this type of lightning protection spark gap 1, the power follow current can be assessed independently of the pulse current in the running region L or inside the quenching chamber 25 since the pulse current is locally restricted to the ignition region Z.

In the present first embodiment, the first diverging electrode 21a has an interruption point 22, with the result that the first diverging electrode 21a has an electrode region 23 which faces the quenching chamber 25 and can be reached only by the power follow current since the power follow current can jump over the interruption point 22 on account of its intrinsic magnetic field.

The indicator device 4' is therefore connected between the first main connection 1a and the disconnected electrode region 23 facing the quenching chamber 25. In the present case, the indicator device 4' has an indicator fuse 4' which can be used to actuate a mechanical actuator S. The switch device 11 for activating the bridge igniter can be enclosed by the mechanical actuator S. Optionally, a frequency-dependent current divider 10 or a PTC thermistor, for example, may be connected in parallel with the indicator fuse 4', as indicated using dashed lines.

The indicator fuse 4' is designed in this case in such a manner that, in the case of excessively high or excessively long power follow currents which are associated with excessively low power follow current limitation or an overload of the lightning protection spark gap 1, the fusible conductor of the indicator fuse 4' fuses and the mechanical actuator S closes the switch device 11, which is in the form of a short-stroke button, for example, in order to activate the bridge igniter 7, as a result of which the fusible link device 8 is destroyed and the lightning protection spark gap 1 is electrically decoupled from the first voltage line S1.

The first predetermined criterion is therefore preferably an $I^2t$ criterion of the power follow current profile, in which the current level is included quadratically and the current duration is included linearly.

The exact stipulation of the first predetermined criterion, for example as an $I^2t$ criterion, depends on the respective design of the lightning protection spark gap 1 and the further boundary conditions and can be empirically and/or theoretically determined in the individual case.

Figure 2:
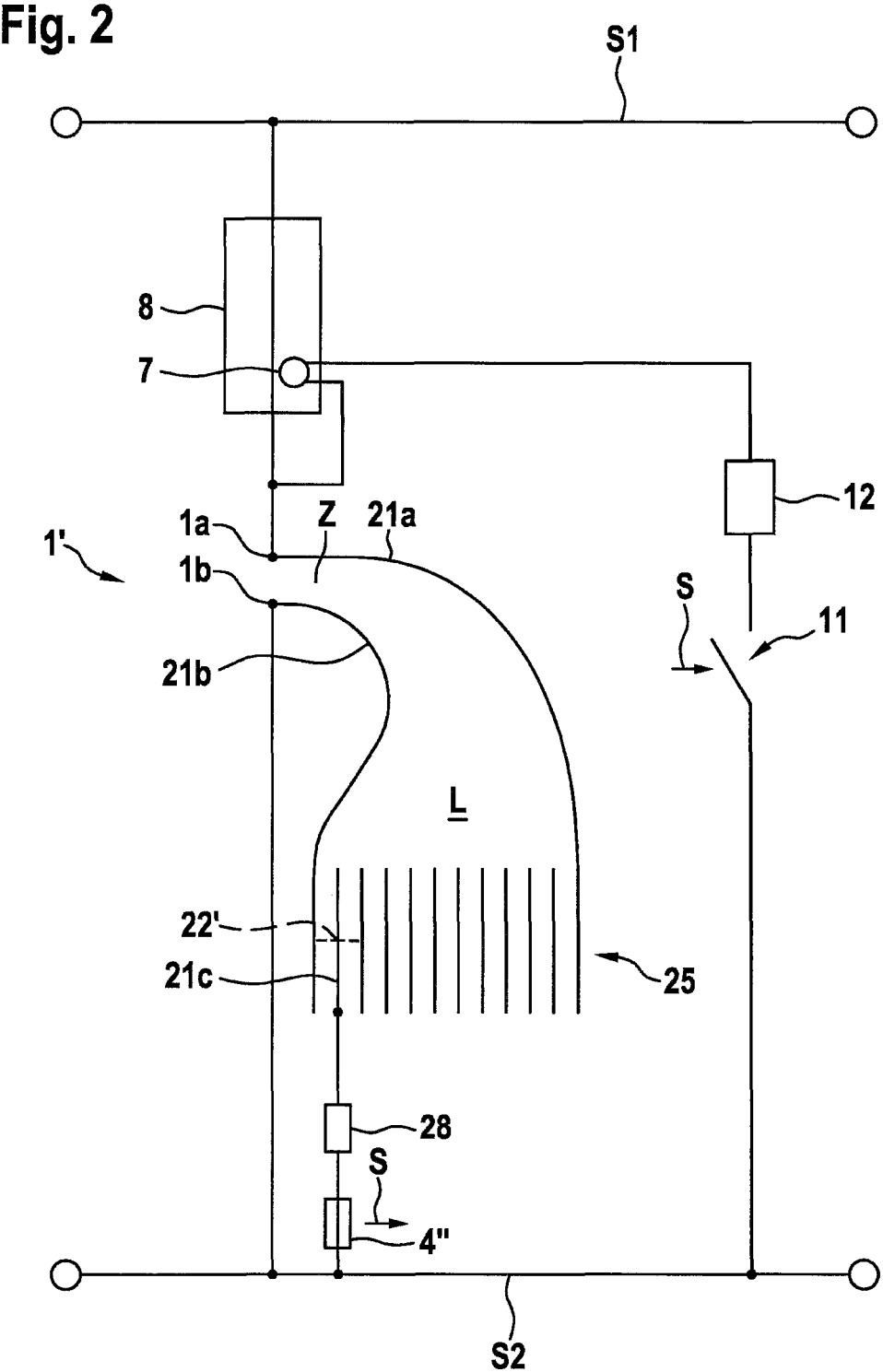
FIG. 2 shows a circuit diagram for explaining a lightning protection spark gap assembly according to a second embodiment of the present invention.

FIG. 2 shows a circuit diagram for explaining a lightning protection spark gap assembly according to a second embodiment of the present invention.

In the second embodiment, the lightning protection spark gap 1' is designed without a trigger connection 1c and without a trigger circuit 2. However, this does not influence the assessment of the power follow current, which is carried out inside the quenching chamber 25 in the second embodiment.

In particular, the indicator device 4" is connected between one of the arc splitter plates 21c and the second main connection 1b in the second embodiment.

A current limiting device 28, for example a non-reactive resistor, is connected upstream of the indicator device 4". The arc splitter plate 21c which is connected to the indicator device 4" has an interruption point 22' which causes the electrical contact between the indicator device 4" and the power follow current arc to be made only after the power follow current arc has completely entered and has been split in the quenching chamber 25.

Like in the first embodiment, the indicator device 4" in the second embodiment is also an indicator fuse 4" which can be used to actuate the mechanical actuator S, as a result of which the switch device 11 for activating the bridge igniter 7 can be closed.

As a result of the power follow current arc, the arc splitter plate 21c is connected to the counter-potential and the power follow current or a partial current thereof therefore loads the indicator fuse 4". The level of the power follow current which is tapped off can be determined by the current limiting device 28 and the choice of the specific arc splitter plate 21c (voltage component). Like in the first embodiment, a frequency-dependent current divider may be provided in parallel with the indicator fuse 4".

Otherwise, the second embodiment is configured like the first embodiment.

Figure 3:
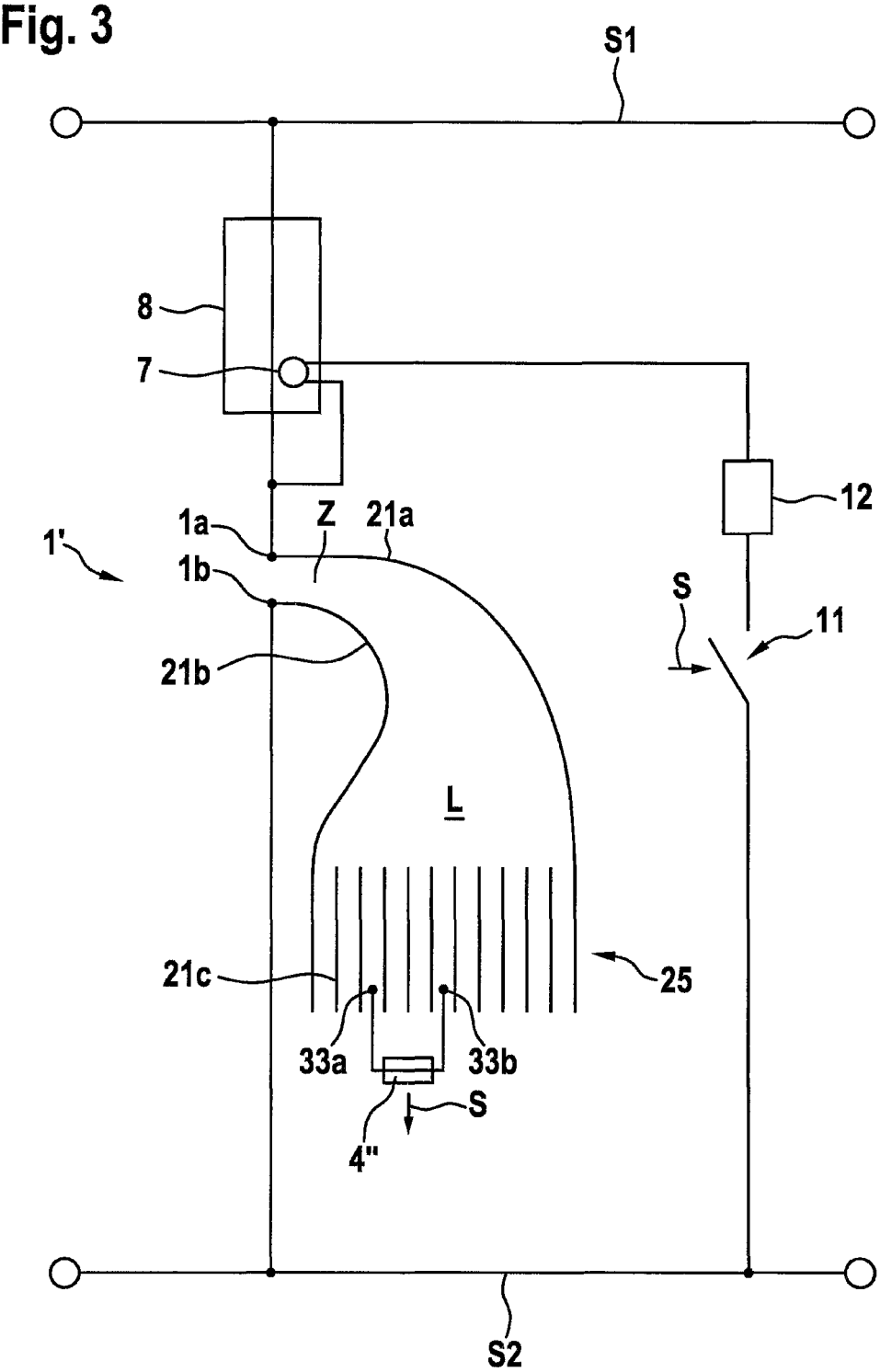
FIG. 3 shows a circuit diagram for explaining a lightning protection spark gap assembly according to a third embodiment of the present invention.

FIG. 3 shows a circuit diagram for explaining a lightning protection spark gap assembly according to a third embodiment of the present invention.

The third embodiment differs from the second embodiment by virtue of the arrangement and electrical contact with the indicator device 4" in the form of the indicator fuse 4".

In particular, the indicator fuse 4" is connected there between a first and a second voltage probe 33a, 33b, wherein the first and second voltage probes 33a, 33b are arranged between two different adjacent arc splitter plates 21c in each case. In the case of power follow current arc contact of the arc splitter plates 21c, the power follow current or a partial current thereof flows via the indicator fuse 4" according to the driving power follow current arc voltage between the arc splitter plates 21c and triggers the activation of the bridge igniter 7 if the first predefined criterion is satisfied.

Otherwise, the third embodiment is configured like the second embodiment.

Figure 4:
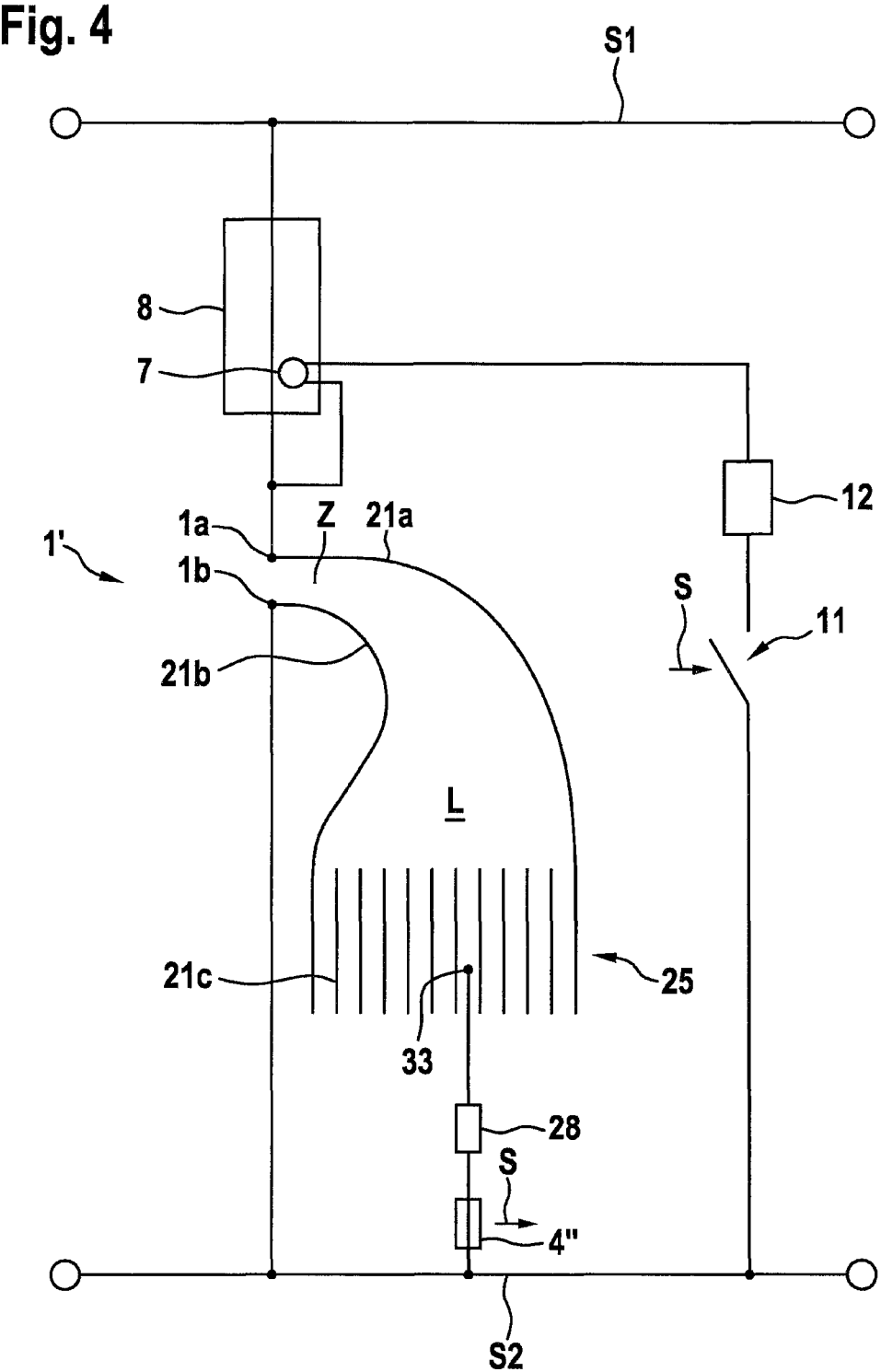
FIG. 4 shows a circuit diagram for explaining a lightning protection spark gap assembly according to a fourth embodiment of the present invention.

FIG. 4 shows a circuit diagram for explaining a lightning protection spark gap assembly according to a fourth embodiment of the present invention.

In the fourth embodiment, the indicator device 4" in the form of the indicator fuse 4" is connected between a voltage probe 33 and the second main connection 1b or the second voltage line S2, wherein the voltage probe 33 is arranged between two adjacent arc splitter plates 21c.

Otherwise, the fourth embodiment is configured like the third embodiment.

Figure 5:
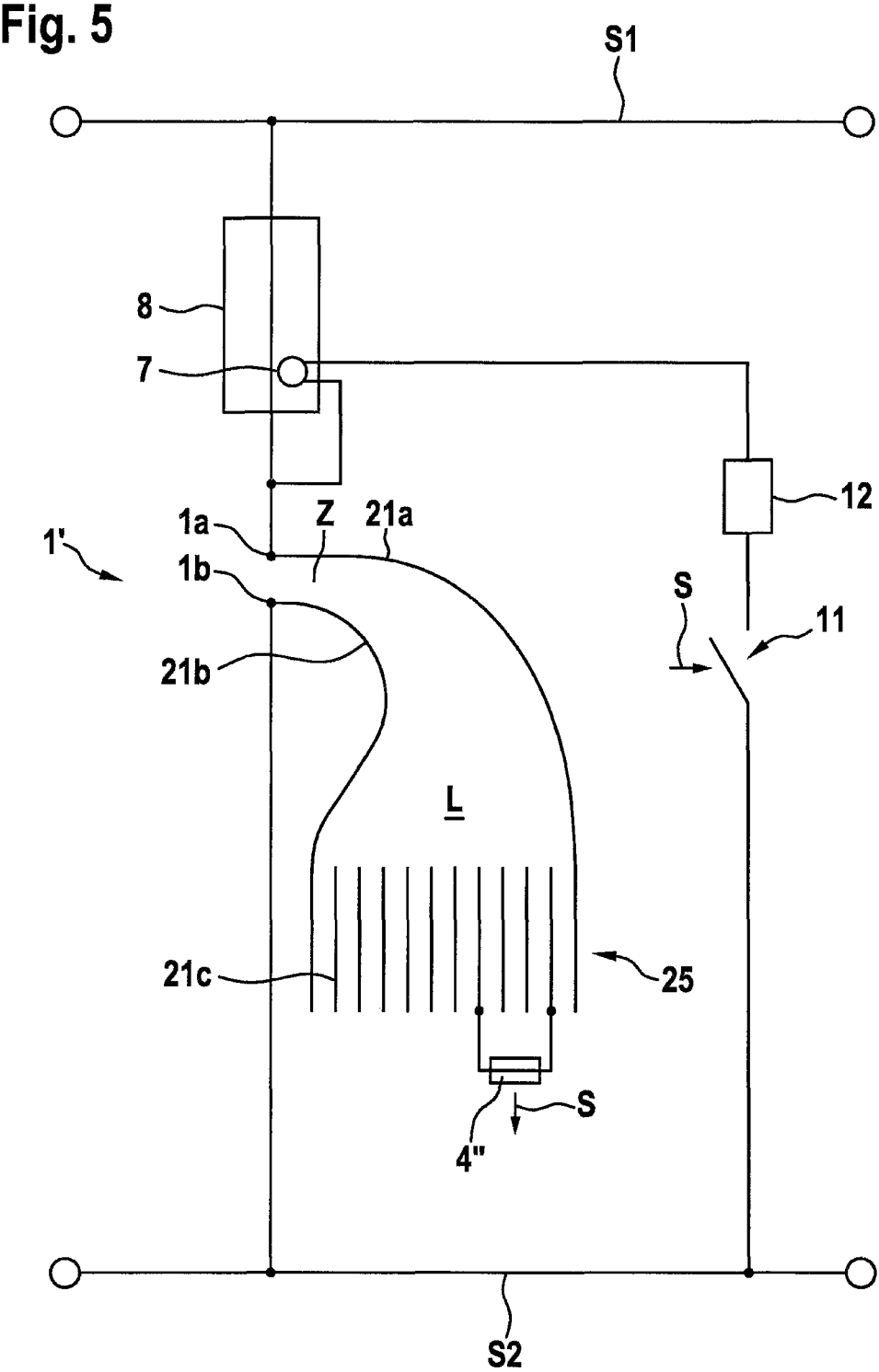
FIG. 5 shows a circuit diagram for explaining a lightning protection spark gap assembly according to a fifth embodiment of the present invention.

FIG. 5 shows a circuit diagram for explaining a lightning protection spark gap assembly according to a fifth embodiment of the present invention.

In the fifth embodiment, the indicator device 4" in the form of the indicator fuse 4" is connected between two arc splitter plates 21c at a distance from one another.

Otherwise, the fifth embodiment is configured like the fourth embodiment.

The first to fifth embodiments described above allow very good matching of the time and level of the current output of the power follow current or a partial current thereof to the behavior of the power follow current arc, as a result of which a functional deviation of the lightning protection spark gap 1 or 1' from the normal function can be detected very well via the destruction of the indicator fuse 4".

In contrast to the first to fifth embodiments described above, the bridge igniter 7 may also be ignited directly by the switching energy of the indicator device 4'" in the form of the indicator fuse 4'", as explained below in connection with the sixth and seventh embodiments.

Figure 6:
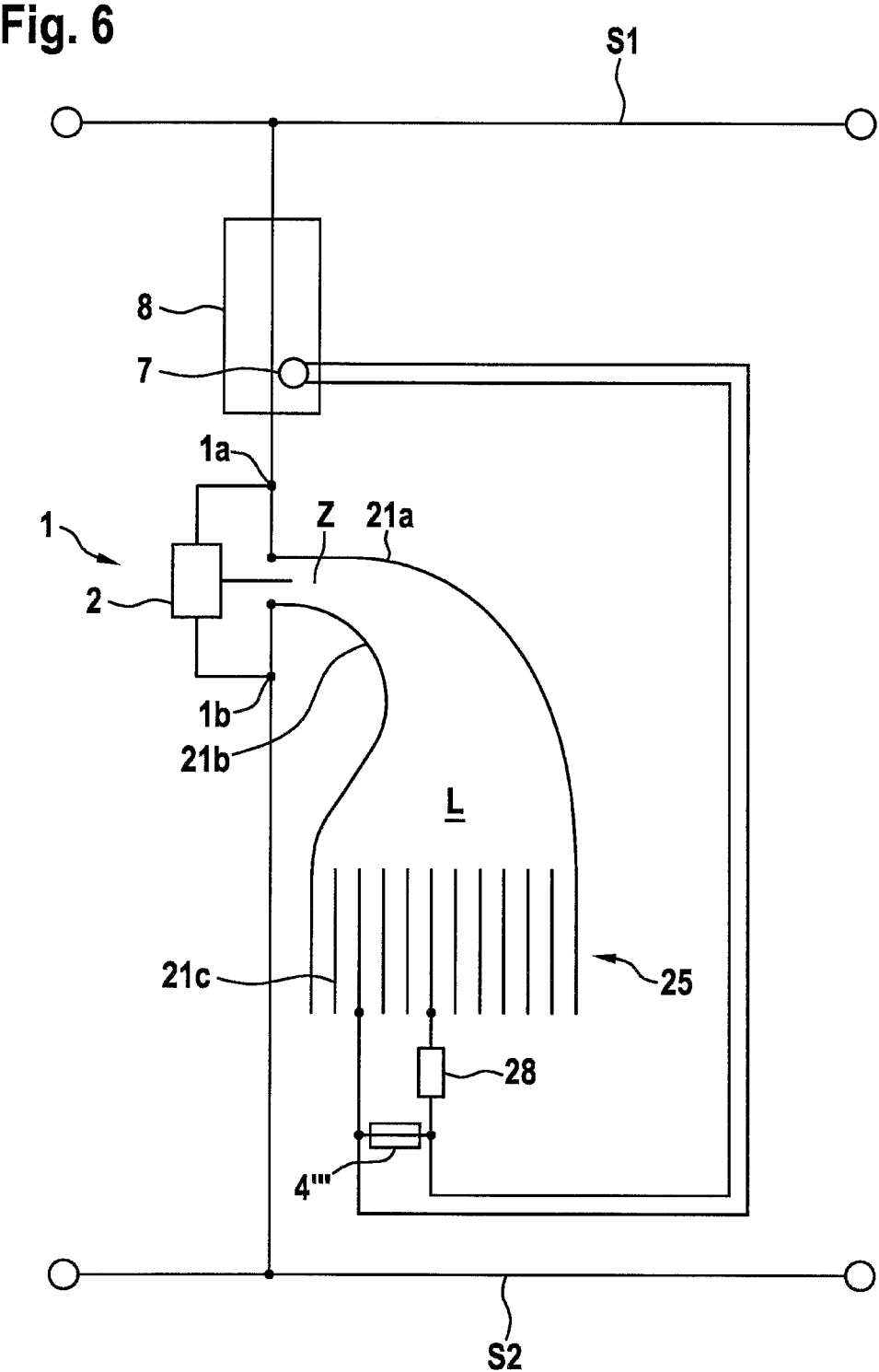
FIG. 6 shows a circuit diagram for explaining a lightning protection spark gap assembly according to a sixth embodiment of the present invention.

FIG. 6 shows a circuit diagram for explaining a lightning protection spark gap assembly according to a sixth embodiment of the present invention.

In the sixth embodiment, the lightning protection spark gap 1 is again a triggerable lightning protection spark gap, as in the first embodiment described above.

At its two connections, the indicator device 4'" in the form of the indicator fuse 4'" is connected in parallel with the bridge igniter 7, on the one hand, and is connected to two arc splitter plates 21c, on the other hand. The required switching energy can be set by selecting the arc splitter plates 21c (voltage drop) and the current limiting resistor 28.

If the follow current arc makes contact with the arc splitter plates 21c, there is a voltage drop across the indicator fuse 4'" which is connected in parallel with the defined fusible wire in the bridge igniter 7. The current flow caused by this is split between the bridge igniter 7 and the indicator fuse 4'".

If the follow current load of the quenching chamber 25 exceeds a limit value according to the first predefined criterion, the current-carrying capacity of the fusible conductor is exceeded and the bridge igniter 7 initiates the triggering of the fusible link 8, as a result of which the lightning protection spark gap 1 is disconnected from the network.

In addition to designing the fusible conductors of the indicator fuse 4'" and of the bridge igniter 7 to control the current distribution, the current limiting resistor 28 may be optionally provided and can limit the current flow into the bridge igniter 7. This limitation not only makes it possible to avoid overloading of the triggering path but also makes it possible to set a time delay of the triggering of the bridge igniter 7.

Figure 7:
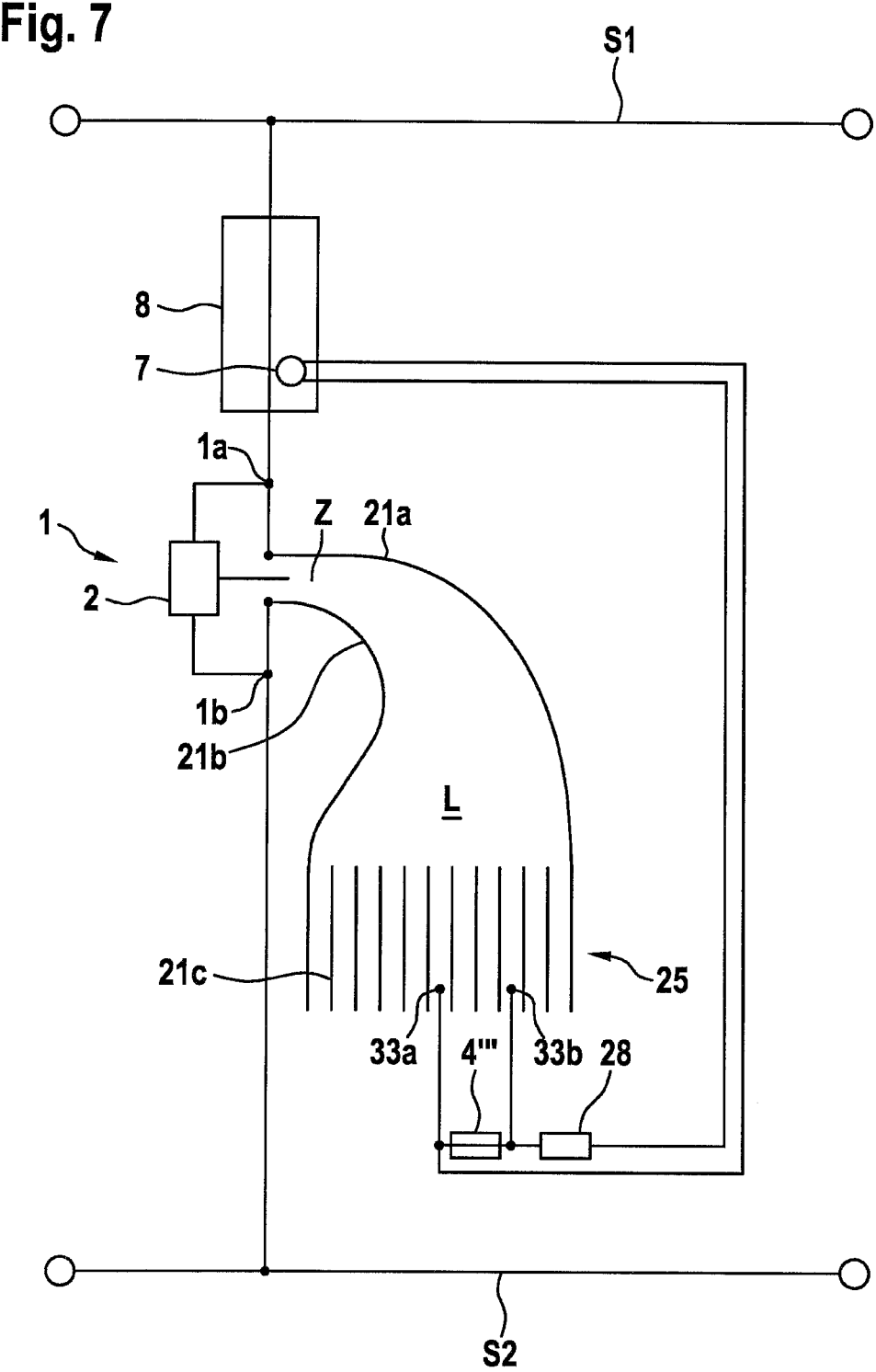
FIG. 7 shows a circuit diagram for explaining a lightning protection spark gap assembly according to a seventh embodiment of the present invention.

FIG. 7 shows a circuit diagram for explaining a lightning protection spark gap assembly according to a seventh embodiment of the present invention.

In the seventh embodiment, in a similar manner to the third embodiment, the indicator fuse 4''' is connected to two voltage probes 33a, 33b which are each arranged between two different adjacent arc splitter plates 21c.

Otherwise, the seventh embodiment is configured like the sixth embodiment.

Figure 8:
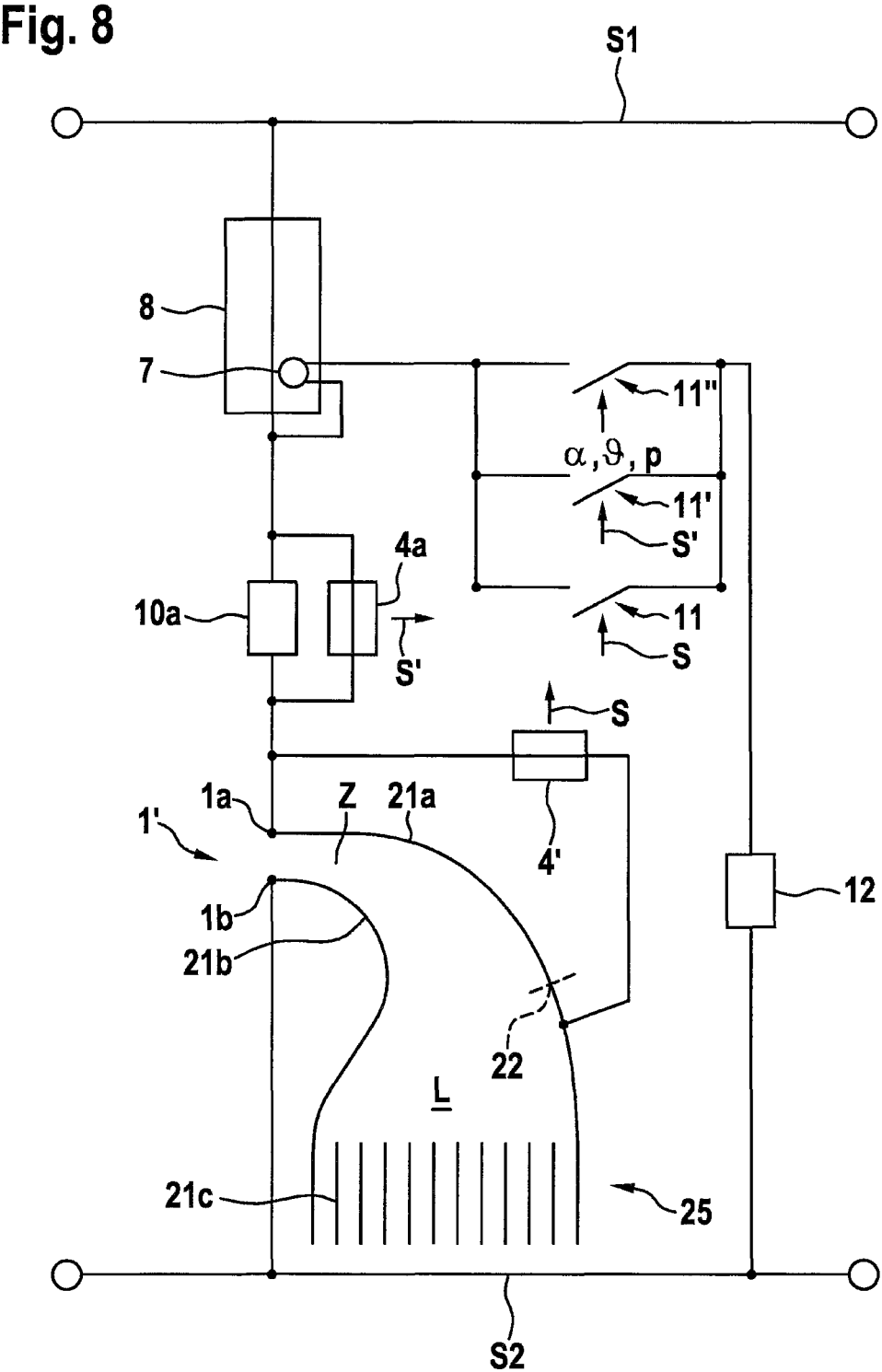
FIG. 8 shows a circuit diagram for explaining a lightning protection spark gap assembly according to an eighth embodiment of the present invention.

FIG. 8 shows a circuit diagram for explaining a lightning protection spark gap assembly according to an eighth embodiment of the present invention.

The eighth embodiment differs from the first embodiment in that the lightning protection spark gap 1' cannot be triggered and a further indicator device 4a for capturing the pulse current profile or a corresponding portion of the pulse current profile and for triggering the fusible link device 8 by activating the bridge igniter 7 if the captured pulse current profile satisfies a second predefined criterion is connected in series with the fusible link device 8 and the lightning protection spark gap 1'.

The further indicator device 4a has a further indicator fuse 4a which can be used to actuate a further mechanical actuator S', wherein a further switch device 11', which is connected in parallel with the switch device 11, for activating the bridge igniter 7 can be closed by the further mechanical actuator S'.

In the eighth embodiment, the pulse currents and the power follow currents can therefore be monitored using independent, locally separate indicator fuses 4a and 4'.

Like in the first predetermined criterion, the current level and current duration of the pulse current profile may be included in the second predetermined criterion, in particular in the form of an $I^2t$ criterion, which should be determined empirically or theoretically in the individual case.

In the eighth embodiment, it is advantageous if the further indicator device 4a is a mechanical actuator S' with an inherent delay which ensures, for example, that a pulse current profile can be discharged via the lightning protection spark gap 1' before the bridge igniter 7 is ignited. Such a delay should be in the range of 1 ms to 5 ms, for example.

Furthermore, one or more secondary criteria or parameters, for example pressure p, temperature ϑ, expansion α etc., can be optionally used to control yet another switch device 11'' which is connected in parallel with the switch devices 11, 11'.

Although the present invention has been completely described above on the basis of preferred exemplary embodiments, it is not restricted thereto, but rather can be modified in various ways.

Although, in the embodiments described above, the lightning protection spark gap has a quenching chamber with arc splitter plates, the present invention is not restricted thereto, but rather can also be used for meander quenching chambers and insulating web quenching chambers, for example.

Similar indicator devices can be used in quenching chambers without arc splitting, for example insulating web or gap or meander chambers. These quenching chambers also first follow the arc running region and are reached substantially only by the power follow current. Voltage probes, for example, can be introduced into the chambers between the webs or in the gap region at different heights inside the chamber and also at different distances and allow a defined voltage difference to be tapped off in the case of arcs. The level of the voltage difference can be used by a defined fusible wire to assess the follow current, just like in quenching chambers with arc splitter plates.

The invention is also not restricted to triggerable lightning protection spark gaps or the triggerable lightning protection spark gap described.

The indicator device is also not restricted to the described embodiments, but rather can be varied in order to perform the defined functions.

Although the above embodiments are therefore indicator devices in the form of mechanical switching devices, electronic or electrical switch devices and components can also be provided and can be used to implement the functions mentioned.

The invention claimed is:

1. A lightning protection spark gap assembly having:
a lightning protection spark gap (1; 1') having a first main connection (1a) and a second main connection (1b);
wherein a first voltage line (S1) of a supply network can be connected to the first main connection (1a) and a second voltage line of the supply network can be connected to the second main connection (1b);
a fusible link device (8) which can be triggered by a bridge igniter (7) and is connected between the first or second voltage line (S1, S2) and the corresponding main connection (1, 1b) of the lightning protection spark gap (1; 1'); and
an indicator device (4'; 4''; 4''') for capturing a power follow current profile following a pulse current profile or a corresponding portion of the power follow current profile and for triggering the fusible link device (8) by activating the bridge igniter (7) if the captured power follow current profile or the corresponding portion of the power follow current profile satisfies a first predefined criterion,
wherein the lightning protection spark gap (1; 1') has a first and a second diverging electrode (21a, 21b) and a quenching chamber (25);
wherein the indicator device (4'; 4''; 4''') is electrically connected to the first or second diverging electrode (21a, 21b) and/or to the quenching chamber (25) in such a manner that it captures the power follow current profile or the corresponding portion of the power follow current profile in the running region (L) of the arc.

2. The lightning protection spark gap assembly as claimed in claim 1, wherein the quenching chamber (25) has a plurality of arc splitter plates (21c), and wherein the indicator device (4'') is connected between one of the arc splitter plates (21c) and the second main connection (1b).

3. The lightning protection spark gap assembly as claimed in claim 2, wherein a current limiting device (28) is connected in series with the indicator device (4'').

4. The lightning protection spark gap assembly as claimed in claim 2, wherein one arc splitter plate (21c) has an interruption point (22') which is arranged in such a manner that an electrical connection to the indicator device (4'') is formed only after the power follow current arc has entered the quenching chamber (25).

5. The lightning protection spark gap assembly as claimed in claim 1, wherein the quenching chamber (25) has a plurality of arc splitter plates (21c), wherein the indicator device (4''; 4''') is connected between a first and a second voltage probe (33a, 33b), and wherein the first and second voltage probes (33a, 33b) are arranged between two different adjacent arc splitter plates (21c) in each case.

6. The lightning protection spark gap assembly as claimed in claim 5, wherein the indicator device (4'; 4''; 4''') has an indicator fuse (4''') and the bridge igniter (7) is connected in parallel with the indicator fuse (4''').

7. The lightning protection spark gap assembly as claimed in claim 6, wherein a current limiting device (28) is connected in series with the indicator device (4'").

8. The lightning protection spark gap assembly as claimed in claim 1, wherein a further indicator device (4a) for capturing the pulse current profile or a corresponding portion of the pulse current profile and for triggering the fusible link device (8) by activating the bridge igniter (7) if the captured pulse current profile or the corresponding portion of the pulse current profile satisfies a second predefined criterion is connected in series with the fusible link device (8).

9. The lightning protection spark gap assembly as claimed in claim 8, wherein the further indicator device (4a) has a further indicator fuse (4a) which can be used to actuate the mechanical actuator (S) or a further mechanical actuator (S), wherein the switch device (11) for activating the bridge igniter (7) can be closed by the mechanical actuator (S) or a further switch device (S') for activating the bridge igniter (7) can be closed by the further mechanical actuator (S').

10. The lightning protection spark gap assembly as claimed in claim 9, wherein a further current divider (10a) is connected in parallel with the further indicator fuse (4a).

11. The lightning protection spark gap assembly as claimed in claim 9, wherein the mechanical actuator (S) or the further mechanical actuator (S') is configured in such a manner that the activation of the bridge igniter (7) can be delayed by a predefined period which is selected in such a manner that the pulse current has substantially decayed before the bridge igniter (7) is activated.

12. The lightning protection spark gap assembly as claimed in claim 11, wherein the predefined period is in the range of 1 ms to 5 ms.

13. The lightning protection spark gap assembly as claimed in claim 8, wherein the switch device (11) or yet another switch device (11") for activating the bridge igniter (8) can be closed by a capture device for secondary parameters ($\alpha$, $\vartheta$, p), in particular temperature ($\vartheta$), pressure (p) and expansion ($\alpha$).

14. The lightning protection spark gap assembly as claimed in claim 8, wherein the current level and the current duration of the pulse current profile or of the corresponding portion of the pulse current profile are included in the second predetermined criterion, in particular the current level is included quadratically and the current duration is included linearly in the second predefined criterion.

15. The lightning protection spark gap assembly as claimed in claim 1, wherein the indicator device (4'; 4"; 4'") has an indicator fuse (4'; 4") which can be used to actuate a mechanical actuator (S), wherein a switch device (11) for activating the bridge igniter (7) can be closed by the mechanical actuator (S).

16. The lightning protection spark gap assembly as claimed in claim 15, wherein a current divider (10) is connected in parallel with the indicator fuse (4').

17. The lightning protection spark gap assembly as claimed in claim 1, wherein the current level and the current duration of the power follow current profile or of the corresponding portion of the power follow current profile are included in the first predetermined criterion, in particular the current level is included quadratically and the current duration is included linearly in the first predefined criterion.

18. The lightning protection spark gap assembly as claimed in claim 1, wherein the first diverging electrode (21a) has an interruption point (22), with the result that the first diverging electrode (21a) has an electrode region (23) which faces the quenching chamber (25) and can be reached only by the power follow current, and wherein the indicator device (4') is connected between the first main connection (1a) and the electrode region (23).

19. The lightning protection spark gap assembly as claimed in claim 1, wherein the quenching chamber (25) has a plurality of arc splitter plates (21c), wherein the indicator device (4") is connected between a voltage probe (33) and the second main connection (1b), and wherein the voltage probe (33) is arranged between two adjacent arc splitter plates (21c).

20. The lightning protection spark gap assembly as claimed in claim 1, wherein the quenching chamber (25) has a plurality of arc splitter plates (21c), wherein the indicator device (4"; 4'") is connected between two arc splitter plates (21c).

21. A method for operating a lightning protection spark gap assembly having:
   a lightning protection spark gap (1; 1') having a first main connection (1a) and a second main connection (1b);
   wherein a first voltage line (S1) of a supply network can be connected to the first main connection (1a) and a second voltage line of the supply network can be connected to the second main connection (1b);
   a fusible link device (8) which can be triggered by a bridge igniter (7) and is connected between the first or second voltage line (S1, S2) and the corresponding main connection (1, 1b) of the lightning protection spark gap (1; 1'); and
   wherein the lightning protection spark (1; 1') has a first and a second diverging electrode (21a, 21b) and a quenching chamber (25);
   wherein the method has the steps of:
   capturing a power follow current profile following a pulse current profile or a corresponding portion of the power follow current profile and triggering the fusible link device (8) by activating the bridge igniter (7) if the captured power follow current profile or the corresponding portion of the power follow current profile satisfies a first predefined criterion,
   wherein the power follow current profile or the corresponding portion of the power follow current profile is captured in the running region (L) of the power follow current arc.

22. The method as claimed in claim 21, wherein the pulse current profile or a corresponding portion of the pulse current profile is captured and the fusible link device (8) is triggered by activating the bridge igniter (7) if the captured pulse current profile or the corresponding portion of the pulse current profile satisfies a second predefined criterion.

23. The method as claimed in claim 22, wherein the activation of the bridge igniter (7) is delayed by a predefined period which is selected in such a manner that the pulse current has substantially decayed before the bridge igniter (7) is activated.

24. The method as claimed in claim 23, wherein the predefined period is in the range of 1 ms to 5 ms.

* * * * *